US008090318B2

(12) United States Patent
Terada et al.

(10) Patent No.: US 8,090,318 B2
(45) Date of Patent: Jan. 3, 2012

(54) DIGITAL DATA PROCESSING CIRCUIT

(75) Inventors: Satoshi Terada, Paramus, NJ (US); Masahiro Obuchi, Oizumi-machi (JP); Tadahiro Makabe, Oizumi-machi (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 453 days.

(21) Appl. No.: 12/391,933

(22) Filed: Feb. 24, 2009

(65) Prior Publication Data

US 2010/0216417 A1 Aug. 26, 2010

(51) Int. Cl.
*H04B 7/00* (2006.01)

(52) U.S. Cl. .......................... 455/42; 455/112; 455/118

(58) Field of Classification Search .................... 455/42, 455/110, 112, 113, 118
See application file for complete search history.

(56) References Cited

U.S. PATENT DOCUMENTS 6,215,981 B1 * 4/2001 Borchardt et al. .............. 455/42
6,950,626 B2 * 9/2005 Suenaga ...................... 455/41.2
7,181,165 B2 * 2/2007 Yongji et al. .................... 455/42
7,860,458 B2 * 12/2010 Mabuchi ...................... 455/41.2

FOREIGN PATENT DOCUMENTS

JP 2006-262521 9/2006
JP 2007-088657 4/2007

* cited by examiner

*Primary Examiner* — Hai L Nguyen
(74) *Attorney, Agent, or Firm* — SoCal IP Law Group LLP; Steven C. Sereboff; John E. Gunther

(57) ABSTRACT

A digital data processing circuit includes: an output unit configured to output to an audio signal processing circuit change data for changing a receiving frequency of a FM receiving device as a first frequency to a second frequency in response to an instruction signal providing an instruction to change the receiving frequency to the second frequency, the audio signal processing circuit being a circuit configured to modulate a carrier wave having the first frequency corresponding to setting data with a modulation signal corresponding to an audio signal to be reproduced by the FM receiving device and to the change data, and transmit the modulated carrier wave to the FM receiving device; and a setting unit configured to set the setting data so as to change a frequency of the carrier wave to the second frequency after the output unit outputs the change data to the audio signal processing circuit.

2 Claims, 4 Drawing Sheets

DIGITAL DATA PROCESSING CIRCUIT

BACKGROUND OF THE INVENTION

1. Field of the Invention

The present invention relates to a digital data processing circuit.

2. Description of the Related Art

In recent years, music data saved in a portable music reproducing device etc. is transmitted by, for example, an FM (Frequency Modulation) transmitter circuit to a car stereo and is reproduced at the car stereo (see, e.g., Japanese Patent Application Laid-Open Publication No. 2006-262521 or No. 2007-88657). FIG. 5 depicts a general configuration of a transmitter-receiver apparatus 200 which includes an FM transmitting device 300 that transmits an audio signal from a portable music reproducing device 310, and an FM receiving device 400 equipped in a car stereo. The FM transmitting device 300 is the device that generates a carrier wave having a frequency corresponding to a result of operation of a controller 320 and that modulates the carrier wave with an audio signal from the portable music reproducing device 310 to output the modulated carrier wave as an FM signal to an antenna 330. The FM receiving device 400 is the device that demodulates an FM signal having a frequency set by a controller 420 among FM signals received by an antenna 410 to reproduce the demodulated signal on a speaker 430 of the car stereo.

When using the transmitter-receiver apparatus 200, a user must first determine a frequency used for transmission and reception in the transmitter-receiver apparatus 200 in consideration of frequencies of FM radio broadcasting etc. used in the surroundings. The user then operates the controller 320 and the controller 420 to enable the transmitter-receiver apparatus 200 to transmit and receive a signal having the determined frequency. As a result, the speaker 430 is able to reproduce an audio signal from the music reproducing device 310.

In the use of the transmitter-receiver apparatus 200, for example, when a reproduced sound from the car stereo is affected by FM radio broadcasting as a result of a change in the surrounding environment, a frequency of an FM signal transmitted and received by the transmitter-receiver apparatus 200 must to be changed. In such a case, the user needs to operate both controller 320 that sets a frequency of a carrier wave from the transmitting device 300, i.e., a transmitting frequency, and controller 420 that sets a receiving frequency of the receiving device 400. There is a problem in that this operation is troublesome to the user.

SUMMARY OF THE INVENTION

A digital data processing circuit comprising: an output unit configured to output to an audio signal processing circuit change data for changing a receiving frequency of a FM receiving device as a first frequency to a second frequency in response to an instruction signal providing an instruction to change the receiving frequency to the second frequency, the audio signal processing circuit being a circuit configured to modulate a carrier wave having the first frequency corresponding to setting data with a modulation signal corresponding to an audio signal to be reproduced by the FM receiving device and to the change data, and transmit the modulated carrier wave to the FM receiving device; and a setting unit configured to set the setting data so as to change a frequency of the carrier wave to the second frequency after the output unit outputs the change data to the audio signal processing circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
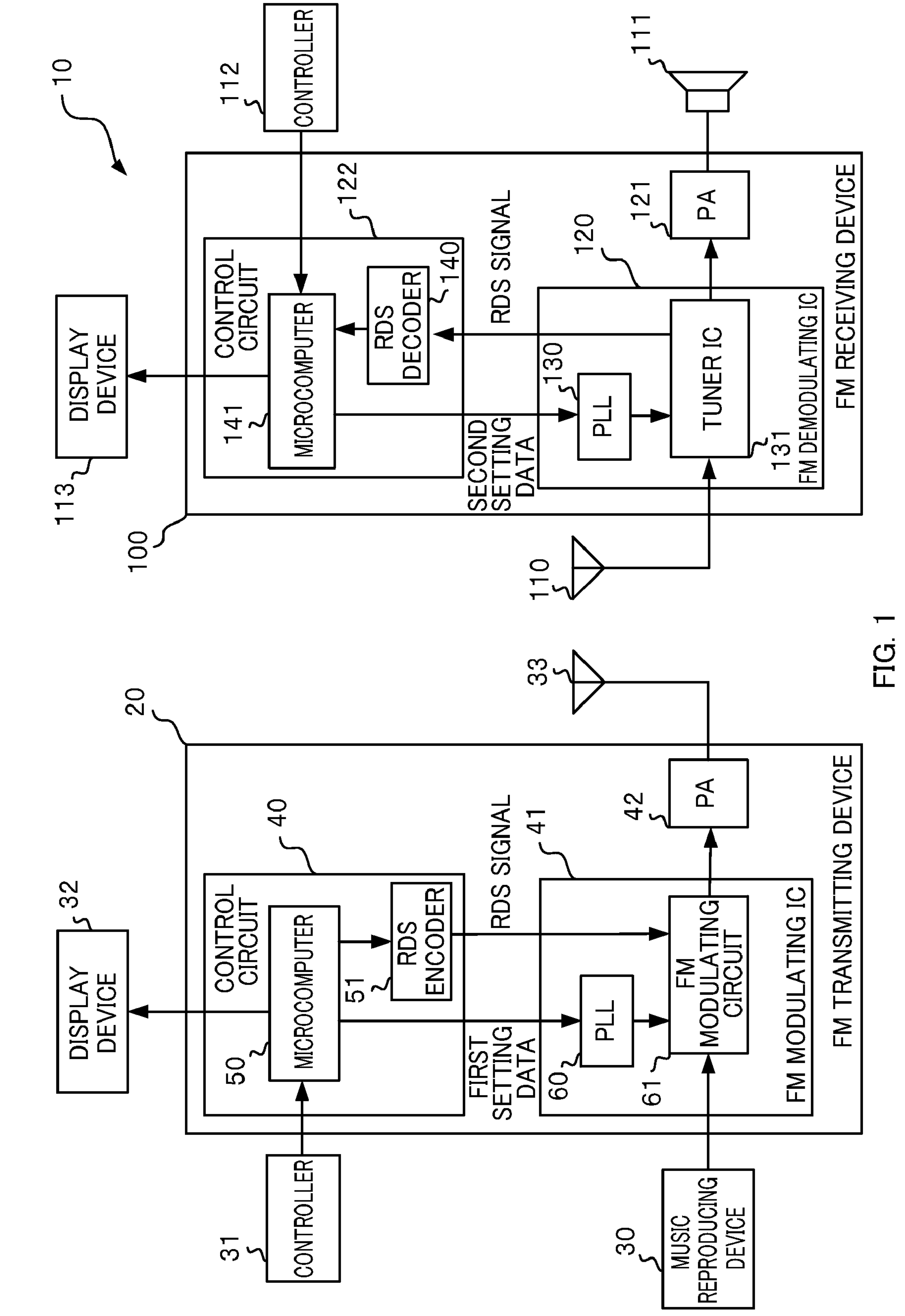
FIG. 1 depicts a configuration of a transmitter-receiver apparatus 10 according to one embodiment of the present invention.

FIG. 1 depicts a configuration of a transmitter-receiver apparatus 10 according to one embodiment of the present invention.

The transmitter-receiver apparatus 10 includes an FM transmitting device 20 capable of transmitting an audio signal and non-audio data in the form of an FM signal, and an FM receiving device 100 capable of receiving the FM signal from the FM transmitting device 20 and demodulating the FM signal to reproduce the audio signal and the data. In this embodiment, the above data is, for example, standard RDS (Radio Data System) data that is standardized by European Committee for Electrotechnical Standardization for transmitting or receiving character data etc. The FM receiving device 100 of this embodiment is, for example, an FM radio in a car stereo.

The FM transmitting device 20 is the device that transmits an audio signal from a music reproducing device 30 and change data for changing a receiving frequency of the receiving device 100 generated in response to an instruction from a controller 31, the audio signal and change data being transmitted in the form of an FM signal. The FM transmitting device 20 includes a control circuit 40, an FM modulating IC (Integrated Circuit) 41, and a power amplifier (PA) 42. A user operates the controller 31 to cause the FM transmitting device 20 to generate a carrier wave having a frequency corresponding to an instruction from the controller 31.

The control circuit 40 is the circuit that controls the FM modulating IC 41 in response to an instruction from the controller 31. The control circuit 40 includes a microcomputer 50 and an RDS encoder 51. The control circuit 40 causes a display device 32, which is provided as, for example, a liquid crystal display device, to display frequency information corresponding to a result of operation of the controller 31.

Figure 2:
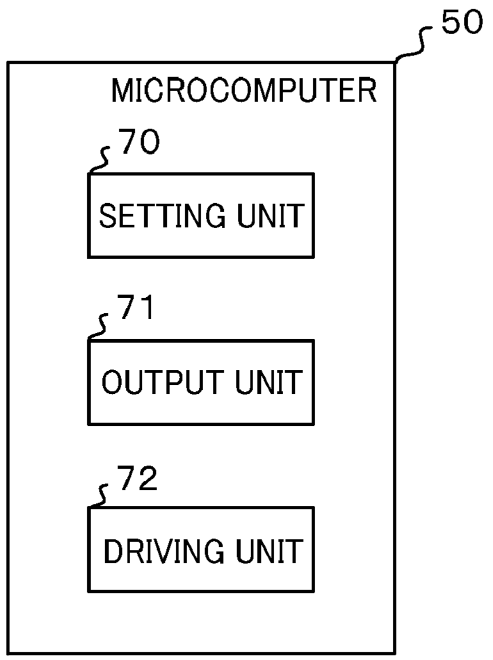
FIG. 2 depicts a configuration of a functional block that is actualized when a microcomputer 50 executes a program.

The microcomputer 50 (digital data processing circuit) is the circuit that actualizes various functions by executing a program stored on internal ROM (Read Only Memory) (not shown) in response to an instruction from the controller 31. FIG. 2 depicts a configuration of a functional block that is actualized when the microcomputer 50 executes the program. The microcomputer 50 of this embodiment executes the program to actualize a setting unit 70, an output unit 71, and a driving unit 72.

The setting unit 70 sets first setting data (setting data) for setting a frequency of a carrier wave from the FM transmitting device 20, i.e., a transmitting frequency, on the FM modulating IC 41 in response to an instruction from the controller 31.

The output unit 71 outputs change data for changing a receiving frequency of the receiving device 100 to the RDS encoder 51 in response to an instruction from the controller 31. The controller 31 of this embodiment outputs a predetermined instruction signal for causing the output unit 71 to output the change data.

The driving unit 72 drives the display device 32 to cause it to display, for example, a frequency of a carrier wave in response to an instruction from the controller 31.

The RDS encoder 51 carries out a predetermined encoding process to digital change data output from the microcomputer 50 to generate digital RDS data. The RDS encoder 51 of this embodiment has a DAC (Digital-to-Analog Converter) (not shown) incorporated therein, thus converts digital RDS data into an analog RDS signal to output the RDS signal to the FM modulating IC 41.

The FM modulating IC 41 is the circuit that generates a carrier wave based on first setting data to transmit an audio signal from the music reproducing device 30 and an RDS signal. The FM modulating IC 41 includes a PLL (Phase Locked Loop) 60 and an FM modulating circuit 61.

The PLL 60 is the circuit that outputs an oscillation signal having a frequency based on first setting data from the microcomputer 50, to the FM modulating circuit 61.

The FM modulating circuit 61 (audio signal processing circuit) is the circuit that generates a carrier wave based on an oscillation signal and a composite signal (modulation signal) corresponding to an audio signal coming in from the music reproducing device 30 and to an RDS signal coming in from the RDS encoder 51, and that modulates the carrier wave with the composite signal to output the modulated signal as an FM signal.

The power amplifier 42 is the circuit that amplifies an FM signal from the FM modulating circuit 61 to output the amplified signal to an antenna 33. The antenna 33, therefore, transmits the FM signal carrying an audio signal and an RDS signal in the multiplexed form and having a transmitting frequency corresponding to first setting data, to the FM receiving device 100.

The FM receiving device 100 is the device that demodulates an FM signal received by an antenna 110 to reproduce an audio signal on a speaker 111. The FM receiving device 100 includes an FM demodulating IC 120, a power amplifier 121, and a control circuit 122. A receiving frequency of the FM receiving device 100 is changed in correspondence to a result of operation of the controller 112 or to an RDS signal carried by the received FM signal.

The FM demodulating IC 120 (FM signal processing circuit) is the circuit that demodulates an FM signal having a frequency based on second setting data (setting data) from the control circuit 122 among FM signals coming in from the antenna 110. The FM demodulating IC 120 includes a PLL 130 and a tuner IC 131. In this embodiment, therefore, a frequency that is set on the FM demodulating IC 120 based on second setting data is a receiving frequency of the FM demodulating IC 120 and of the FM receiving device 100.

The PLL 130 is the circuit that outputs an oscillation signal having a frequency based on second setting data from the control circuit 122, to the tuner IC 131.

The tuner IC 131 demodulates an input FM signal with an oscillation signal to generate a composite signal. The tuner IC 131 also serves as the circuit that separates an audio signal and an RDS signal from a composite signal. The tuner IC 131 of this embodiment outputs the audio signal to the power amplifier 121, and the RDS signal to an RDS decoder 140.

The power amplifier 121 amplifies an audio signal from the tuner IC 131 to reproduce the amplified signal on the speaker 111.

The control circuit 122 is the circuit that generates second setting data for setting a receiving frequency of the FM demodulating IC 120 in response to an instruction from the controller 112 operated by a user or to an RDS signal from the tuner IC 131. The control circuit 122 causes a display device 113, which is provided as, for example, a liquid crystal display device, to display, for example, the receiving frequency. The control circuit 122 of this embodiment includes the RDS decoder 140 and a microcomputer 141.

The RDS decoder 140 carries out a predetermined decoding process on an RDS signal output from the tuner IC 131 to output the decoded RDS signal to the microcomputer 141.

Figure 3:
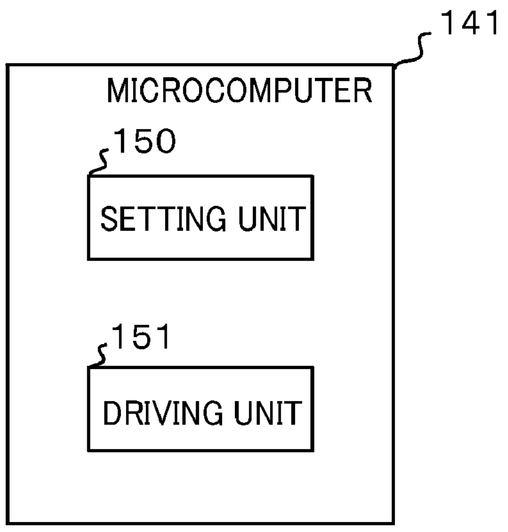
FIG. 3 depicts a configuration of a functional block that is actualized when a microcomputer 141 executes a program.

The microcomputer 141 is the circuit that actualizes various functions by executing a program stored on an internal ROM (not shown) in response to an instruction from the controller 112 or to an output signal from the RDS decoder 140. FIG. 3 depicts a configuration of a functional block that is actualized when the microcomputer 141 executes the program. The microcomputer 141 of this embodiment executes the program to actualize a setting unit 150 and a driving unit 151.

The setting unit 150 sets second setting data for setting a receiving frequency of the FM receiving device 100 on the FM demodulating IC 120 in response to an instruction from the controller 112. When an output signal from the RDS decoder 140 is change data generated by the FM transmitting device 20, the setting unit 150 of this embodiment sets second setting data based on the change data on the FM demodulating IC 120.

The driving unit 151 drives the display device 113 so that the display device 113 can display a receiving frequency of the FM receiving device 100 in response to an instruction from the controller 112 or to an output signal from the RDS decoder 131.

Figure 4:
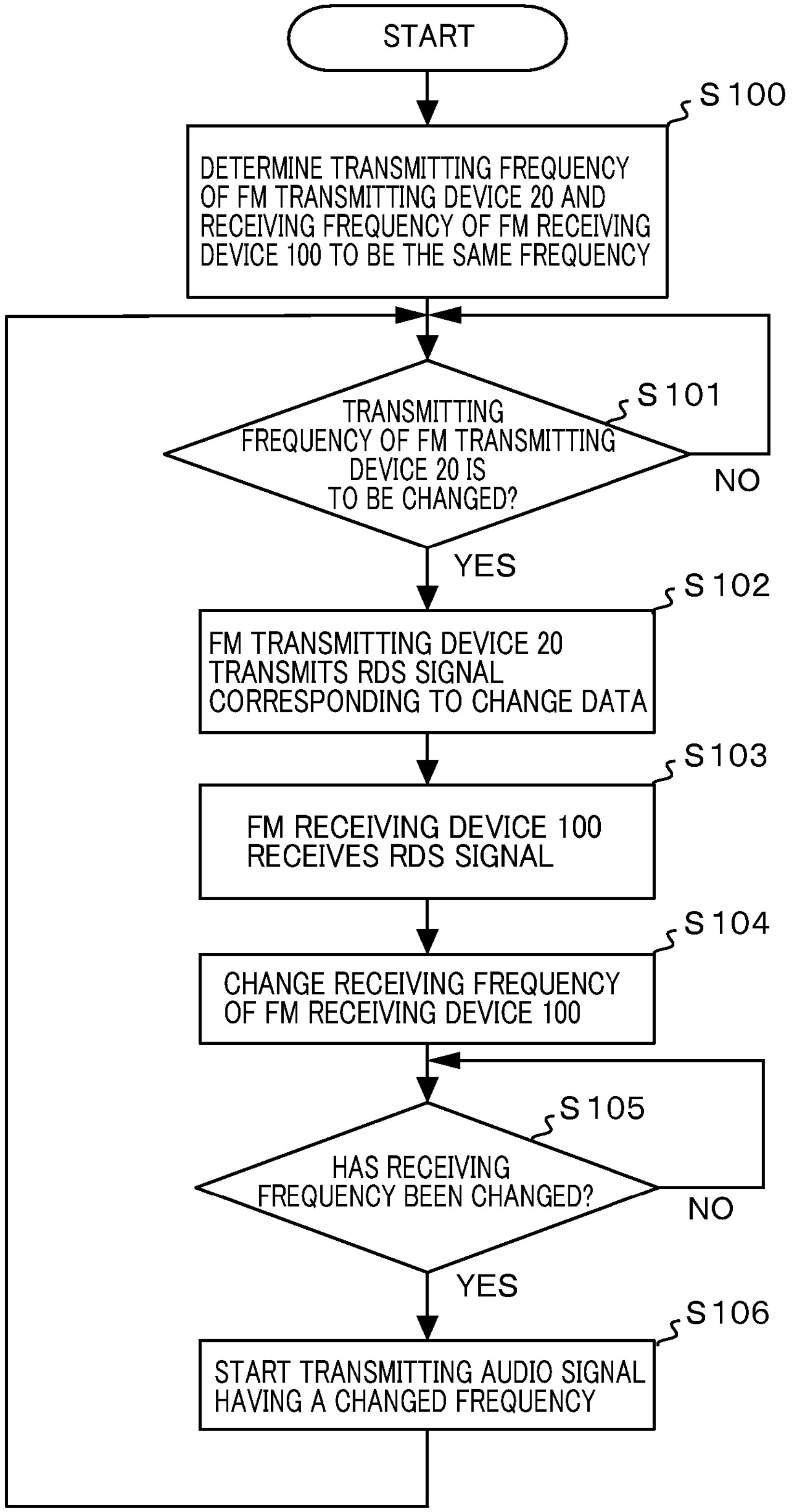
FIG. 4 is a flow chart for explaining the operation of the transmitter-receiver apparatus 10.
Figure 5:
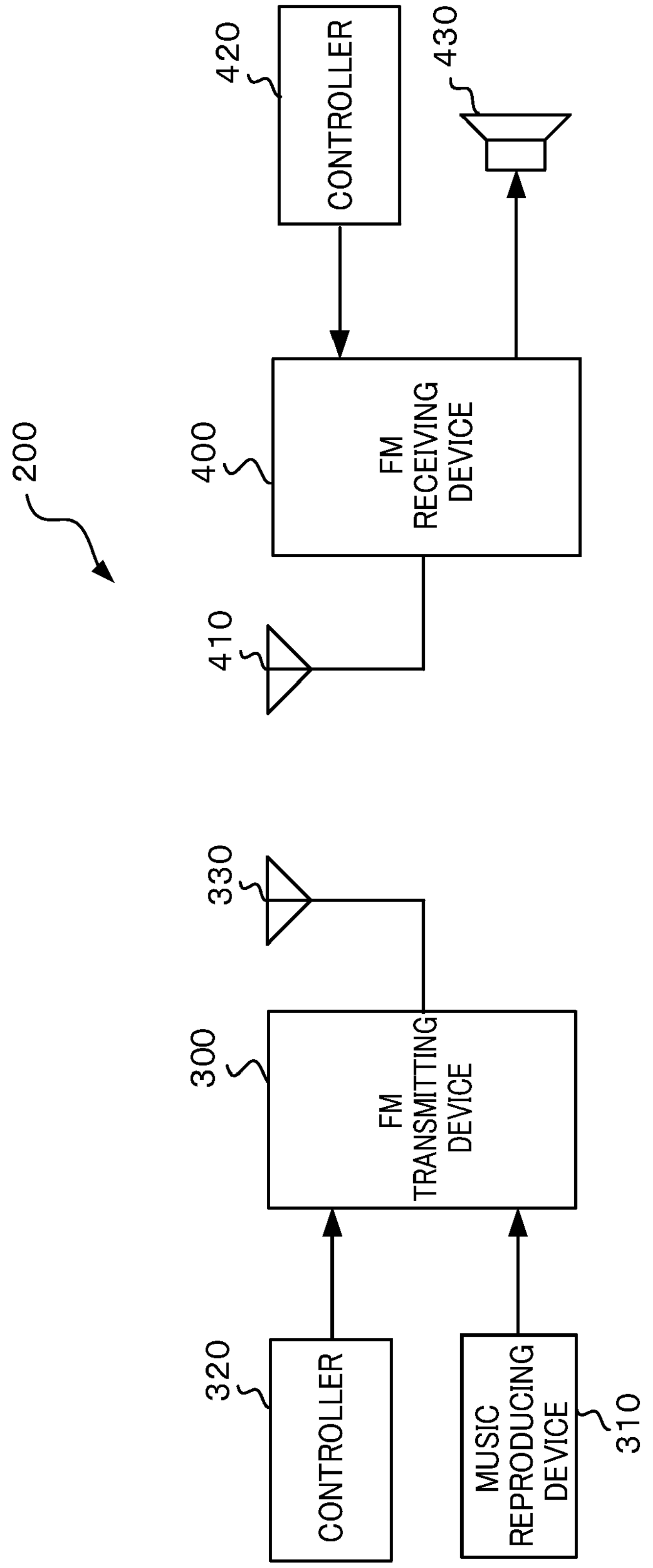
FIG. 5 PRIOR ART
FIG. 5 shows an example of a transmitter-receiver apparatus.

The operation of the transmitter-receiver apparatus 10 will be described referring to a flow chart of FIG. 4. A user sets a transmitting frequency of the FM transmitting device 20 and a receiving frequency of the FM receiving device 100 in consideration of the effect of FM radio broadcasting etc. Specifically, the user operates the controller 31 to determine the transmitting frequency to be, for example, 100 MHz (first frequency) (S100). According to the result of operation of the controller 31, the setting unit 70 sets first setting data that determines the transmitting frequency of the FM modulating IC 41 to be 100 MHz, on the FM modulating IC 41. The user also operates the controller 112 to determine the receiving frequency to be the same as the transmitting frequency of 100 MHz (S100). According to the result of operation of the controller 112, the setting unit 150 sets second setting data that determines the receiving frequency of the FM demodulating IC 120 to be 100 MHz, on the FM demodulating IC 120. When both of the transmitting frequency of the FM transmitting device 20 and the receiving frequency of the FM receiving device 100 are determined to be 100 MHz, the user starts reproducing music saved in the music reproducing device 30. As a result, the speaker 111 reproduces the music from the music reproducing device 30. When reproduced sounds from the speaker 111 are not affected by, for example, FM radio broadcasting etc. (NO at S101), the user does not have to change the transmitting frequency of the FM transmitting device 20, thus continues to transmit the music at the transmitting frequency of 100 MHz. In contrast, when reproduced sounds from the speaker 111 are affected by FM radio broadcasting as a result of a change in the surrounding environment etc. (YES at S101), the user must change the transmitting frequency and receiving frequency to a frequency other than 100 MHz. It is assumed in this embodiment that the transmitting frequency and receiving frequency are changed from 100 MHz to, for example, 108 MHz (second frequency), and that reproduction operation of the music reproducing device 30 is suspended when the transmitting-receiving frequency is changed. To change the transmitting-receiving frequency to 108 MHz, the user operates the controller 31 so that a frequency displayed on the display device 32 changes to 108 MHz. When the frequency displayed on the display device 32 becomes 108 MHz, the user presses a frequency change selection button (not shown) on the controller 31. As a result, the controller 31 outputs an instruction signal to instruct on changing the transmitting-receiving frequency, to the output unit 71. Responding to the instruction signal, the output unit 71 generates change data for changing the receiving frequency to 108 MHz, and outputs the change data to the RDS encoder 51. As described above, the RDS encoder 51 carries out the predetermined encoding process on the change data, and outputs the encoded change data as an RDS signal to the FM modulating IC 41. At this stage, because the transmitting-receiving frequency is not changed yet, the RDS signal corresponding to the change data for changing the receiving frequency to 108 MHz is transmitted in the form of an FM signal of 100 MHz (S102). The FM receiving device 100 then receives the FM signal of 100 MHz transmitted from the FM transmitting device 20, and demodulates the FM signal to output the RDS signal corresponding to the change data to the RDS decoder 140 (S103). The RDS decoder 140 carries out the predetermined decoding process on the input RDS signal, as described above, so that the RDS decoder 140 consequently outputs the change data. Since the change data is the data for changing the receiving frequency to 108 MHz, the setting unit 150 sets second setting data for the FM demodulating IC 120, based on the change data, so that the receiving frequency of the FM demodulating IC 120 becomes 108 MHz (S104). The driving unit 151 of this embodiment updates display of a receiving frequency on the display device 113 when the receiving frequency of the FM demodulating IC 120 is set. When the receiving frequency displayed on the display device 113 is 100 MHz (YES at S105), the user waits until the displayed receiving frequency is changed to 108 MHz. When the receiving frequency displayed on the display device 113 is changed to 108 MHz (YES at S105), the user presses a frequency change decision button (not shown) on the controller 31 to fix the transmitting-receiving frequency of 108 MHz. As a result, the controller 31 outputs a signal for changing the transmitting frequency to 108 MHz, to the setting unit 70. Responding to the output signal from the controller 31, the setting unit 70 generates first setting data for determining the transmitting frequency to be 108 MHz, and outputs the first setting data to the FM modulating IC 41. Hence the transmitting frequency of the FM transmitting device 20 is changed to 108 MHz. Since the driving unit 72 causes the display device 32 to display the updated transmitting frequency, the user starts the music reproducing device 30 to resume reproduction of music when the transmitting frequency is changed from 100 MHz to 108 MHz. Thus, the transmitting-receiving apparatus 10 transmits/receives the music from the music reproducing device 30 at the transmitting-receiving frequency of 108 MHz. Hence the speaker 111 reproduces the music from the music reproducing device 30. When reproduced sounds are affected by a radio etc. during transmitting-receiving signal at the frequency of 108 MHz, the user repeats the processes of steps S101 to S104 to be able to set a frequency that is free from the effect of the radio.

According to the transmitting-receiving apparatus 10 of this embodiment having the above configuration, when changing the transmitting-receiving frequency, the user first presses the frequency change selection button (not shown) on the controller 31 to cause the FM transmitting device 20 to transmit the change data for changing the receiving frequency to 108 MHz at the frequency of 100 MHz that is not yet changed. As a result, the receiving frequency of the FM receiving device 100 is changed from 100 MHz to 108 MHz. The user then presses the frequency change decision button (not shown) on the controller 31 to determine the transmitting frequency of the FM transmitting device 20 to be 108 MHz. As a result, the transmitting-receiving apparatus 10 becomes capable of signal transmission/reception at the frequency of 108 MHz. In this embodiment, therefore, the user is allowed to change the receiving frequency without operating controller 112 that controls the FM receiving device 100. This can reduce the burdens on the user who is changing the transmitting-receiving frequency.

In this embodiment, the setting unit 150 of the FM receiving device 100 is capable of setting the receiving frequency based on the change data from the RDS decoder 140. The user is, therefore, is allowed to change the receiving frequency without operating controller 112 that controls the FM receiving device 100. This can reduce the burdens on the user who is changing the transmitting-receiving frequency.

The above embodiments of the present invention are simply for facilitating the understanding of the present invention and are not in any way to be construed as limiting the present invention. The present invention may variously be changed or altered without departing from its spirit and encompass equivalents thereof.

While it is confirmed by the display device 113 at step S105 whether or not receiving frequency change has been completed in this embodiment, the transmitting frequency may be changed to 108 MHz without confirmation of the display device 113, for example, at the point in time that the change data for changing the receiving frequency to 108 MHz is transmitted at the transmitting frequency of 100 MHz at step S103. This case offers the same effect as achieved in this embodiment.

While the RDS encoder 51 is included in the control circuit 40 in this embodiment, the RDS encoder 51 may be included in, for example, the FM modulating IC 41.

While the change data for changing the receiving frequency is processed as RDS data in this embodiment, the change data may be processed by adopting RDBS (Radio Broadcasting Data System), which is the U.S. standard data format.

What is claimed is:

1. A digital data processing circuit comprising:

an output unit configured to output to an audio signal processing circuit change data for changing a receiving frequency of a FM receiving device from a first frequency to a second frequency in response to an instruction signal providing an instruction to change the receiv ing frequency to the second frequency, the audio signal processing circuit configured to modulate a carrier wave having the first frequency corresponding to setting data with a modulation signal corresponding to an audio signal to be reproduced by the FM receiving device and to the change data, and transmit the modulated carrier wave to the FM receiving device; and a setting unit configured to set the setting data so as to change a frequency of the carrier wave to the second frequency after the output unit outputs the change data to the audio signal processing circuit.

2. A digital data processing circuit comprising:

a setting unit configured to set setting data on an FM signal processing circuit based on change data from the FM signal processing circuit configured to demodulate an FM signal having a first frequency corresponding to the setting data to extract an audio signal and the change data, the setting data being data for setting a receiving frequency of the FM signal processing circuit to a second frequency, the change data being data for changing the receiving frequency to the second frequency.

* * * * *